(12) United States Patent
Jung

(10) Patent No.: US 7,012,994 B2
(45) Date of Patent: Mar. 14, 2006

(54) EMERGENCY CALLING VIA A CABLE MODEM

(75) Inventor: Byeong-Woo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/933,460

(22) Filed: Sep. 3, 2004

(65) Prior Publication Data

US 2005/0141675 A1    Jun. 30, 2005

(30) Foreign Application Priority Data

Sep. 5, 2003   (KR) ..................... 10-2003-0062229

(51) Int. Cl.
*H04M 11/04* (2006.01)

(52) U.S. Cl. ..................... 379/45; 379/37; 379/39; 725/106

(58) Field of Classification Search ........... 379/37–51, 379/90.01, 93.07; 725/111, 106

See application file for complete search history.

(56) References Cited

U.S. PATENT DOCUMENTS

| | | | |
|---|---|---|---|
| 5,034,948 A | 7/1991 | Mizutani et al. | |
| 5,999,612 A | 12/1999 | Dunn et al. | |
| 6,029,047 A | 2/2000 | Ishida et al. | |
| 6,393,104 B1 | 5/2002 | Akhteruzzaman et al. | |
| 6,466,651 B1 * | 10/2002 | Dailey | 379/37 |
| 6,570,974 B1 | 5/2003 | Gerszberg et al. | |
| 6,587,546 B1 | 7/2003 | Stumer et al. | |
| 6,614,884 B1 | 9/2003 | Jang | |
| 6,678,356 B1 | 1/2004 | Stumer et al. | |
| 2002/0001367 A1 | 1/2002 | Lee | |
| 2002/0136358 A1 | 9/2002 | Stumer et al. | |
| 2002/0136359 A1 | 9/2002 | Stumer et al. | |
| 2003/0035514 A1 | 2/2003 | Jang | |
| 2003/0043974 A1 | 3/2003 | Emerson, III | |
| 2003/0093563 A1 | 5/2003 | Young et al. | |
| 2003/0202462 A1 | 10/2003 | Smith et al. | |
| 2003/0210766 A1 | 11/2003 | Lin et al. | |

* cited by examiner

*Primary Examiner*—Wing F. Chan
(74) *Attorney, Agent, or Firm*—Robert E. Bushnell, Esq.

(57) ABSTRACT

An emergency calling system and method via a cable modem includes a cable modem connected to a Public Switched Telephone Network (PSTN) backup line in a cable modem-based Internet telephone service to transmit the emergency telephone number inputted by a subscriber telephone to the PSTN via the PSTN backup line. This enables an emergency calling function via a PSTN backup circuit and stable PSTN in a cable modem-based Internet telephone service. This also allows a cable modem-based Internet telephone service to promptly provide urgent emergency calling via the PSTN line in case of an emergency.

14 Claims, 3 Drawing Sheets

EMERGENCY CALLING VIA A CABLE MODEM

CLAIM OF PRIORITY

This application makes reference to, incorporates the same herein, and claims all benefits accruing under 35 U.S.C. § 119 from an application for EMERGENCY CALLING SYSTEM AND METHOD VIA A CABLE MODEM earlier filed in the Korean Intellectual Property Office on 5 Sep. 2003 and there duly assigned Ser. No. 2003-62229.

BACKGROUND OF THE INVENTION

1. Field of the Invention

The present invention relates to an emergency calling via a cable modem. More particularly, the cable modem is connected to a Public Switched Telephone Network (PSTN), in response to an emergency telephone number received from a subscriber via a telephone line, to transmit a calling signal corresponding to the received emergency telephone number to the PSTN via a PSTN backup line connected to the cable modem.

2. Description of the Related Art

In general, a modem is constructed to transmit and receive data via a telephone line, whereas a cable modem is connected to a cable network via a coaxial cable to allow a link to the Internet. Current cable modems in the cable network support a transmission rate of about 30 Mbps.

In such a cable modem-based Internet telephone service, there is global demand for an emergency calling function to be carried out via a PSTN backup line and the stable TSTN.

However, there is a problem in that conventional emergency calling service via a cable modem cannot promptly cope with an emergency since it transmits an emergency call signal to a (Cable Modem Terminal System) CMTS via the cable modem and then to a backbone network via the CMTS, thereby consuming a long time delay before an emergency call is linked.

U.S. Pat. No. 6,393,104 to Akhteruzzaman et al., entitled ENHANCED LIFE-LINE SERVICE FOR CABLE TELEPHONE CUSTOMERS, issued on May 21, 2002, which relates to an arrangement for enhancing the capabilities of emergency service provisions for telephone stations served by a cable system. In accordance with the prior art, telephone stations served by cable systems are frequently provided with access to an emergency telephone line for making emergency calls when the cable system lacks power, or is otherwise inoperative. In accordance with this invention, the emergency service line is used for making incoming calls directed to all telephones connected to the emergency line, using a different telephone number for the emergency call. Outgoing service is also provided to the telephones connected to the emergency line. Advantageously, the value of the emergency line service is substantially enhanced.

U.S. Patent Application No. 2002/0001367 to Lee, entitled COMPUTER HAVING EMERGENCY CALLING FUNCTION AND EMERGENCY CALLING METHOD USING COMPUTER, published on Jan. 3, 2002, which disclosed that, in a computer having an emergency calling function for detecting an emergency situation and for transferring an emergency call message previously set by a user to a preset emergency call telephone number, a non-volatile memory stores information which is not lost if power is turned off. A message/telephone number setter receives an emergency call message indicating an emergency situation and an emergency call telephone number which are input by a user and stores the received message and number in the non-volatile memory. An emergency call button generates an emergency detection signal when the user presses an emergency call button. A microprocessor receives the emergency detection signal from the emergency call button and restores the computer from a power-save state or a power-off state to a normal state. An emergency call controller reads the emergency call message and emergency call telephone number from the non-volatile memory and makes a telephone call to the emergency call telephone number to transfer the emergency call message, after an operational state of the computer has been restored to a normal state by the microprocessor.

U.S. Patent Application No. 2003/0202462 to Smith et al., entitled METHOD AND APPARATUS FOR FAIL OVER PROTECTION IN A VOICE OVER INTERNET COMMUNICATION SYSTEM, published on Oct. 30, 2003, which discloses that, in a packet data communications system (100) that supports VoIP communications via cable modem, a fail over detector (200) identifies trouble (eq, no dial tone, delayed dial tone, low quality of service, no voltage, no current, network busy) on or within the communications path. In response, voice communications are switched to a secondary path, such as, for example, the PSTN, or some other reliable and/or predictable communications network, thereby insuring uninterrupted voice communications.

U.S. Pat. No. 6,587,546 to Stumer et al., entitled METHODS AND APPARATUS FOR DIALING AN EMERGENCY TELEPHONE NUMBER FROM A TELEWORKING CLIENT REMOTELY COUPLED TO A PBX, issued on Jul. 1, 2003, which relates to methods for dialing an emergency telephone number from a teleworking client according to the invention include detecting at the teleworking client when an emergency number is dialed, disconnecting the teleworking client from the PBX/MLTS, connecting the teleworking client to the PSTN, and dialing an associated stored number. The apparatus of the invention resides in software that is installed in off the shelf hardware. Though the invention is described with reference to a teleworking client, it may also be applied to any other dialup network connection U.S. Pat. No. 6,678,356 to Stumer et al., entitled SYSTEMS FOR DIALING AN EMERGENCY TELEPHONE NUMBER FROM A TELEWORKING CLIENT REMOTELY COUPLED TO A PBX, issued on Jan. 13, 2004, which relates to systems for dialing an emergency telephone number from a teleworking client according to the invention include apparatus that implement the steps of detecting at a teleworking client when an emergency number is dialed, disconnecting the teleworking client from the PBX/MLTS, connecting the teleworking client to the PSTN, and dialing an associated stored number. Though the invention is described with reference to a teleworking client, it may also be applied to any other dialup network connection.

U.S. Patent Application No. 2002/0136358 to Stumer et al., entitled SYSTEMS FOR DIALING AN EMERGENCY TELEPHONE NUMBER FROM A TELEWORKING CLIENT REMOTELY COUPLED TO A PBX, published on Sep. 26, 2002, which relates to systems for dialing an emergency telephone number from a teleworking client according to the invention include apparatus that implement the steps of detecting at a teleworking client when an emergency number is dialed, disconnecting the teleworking client from the PBX/MLTS, connecting the teleworking client to the PSTN, and dialing an associated stored number.

Though the invention is described with reference to a teleworking client, it may also be applied to any other dialup network connection.

U.S. Patent Application No. 2002/0136359 to Stumer et al., entitled METHODS AND APPARATUS FOR DIALING AN EMERGENCY TELEPHONE NUMBER FROM A TELEWORKING CLIENT REMOTELY COUPLED TO A PBX, published on Sep. 26, 2002, which relates to methods for dialing an emergency telephone number from a teleworking client according to the invention include detecting at the teleworking client when an emergency number is dialed, disconnecting the teleworking client from the PBX/MLTS, connecting the teleworking client to the PSTN, and dialing an associated stored number. The apparatus of the invention resides in software that is installed in off the shelf hardware. Though the invention is described with reference to a teleworking client, it may also be applied to any other dialup network connection.

The following patents also each discloses features in common with the present invention but do not teach or suggest the inventive features specifically recited in the present application: U.S. Pat. No. 6,029,047 to Ishida et al., entitled CABLE TELEPHONY TERMINAL DEVICE HAVING A CALL LINE SELECTOR, issued on Feb. 22, 2000; U.S. Pat. No. 5,999,612 to Dunn et al., entitled INTEGRATED TELEPHONY AND DTA SERVICES OVER CABLE NETWORKS, issued on Dec. 7, 1999; U.S. Pat. No. 5,034,948 to Mizutani et al., entitled TELEPHONE APPARATUS SYSTEM, issued on Jul. 23, 1991; U.S. Pat. No. 6,570,974 to Gerszberg et al., entitled CABLE CONNECTED NETWORK SERVER PLATFORM FOR TELEPHONE WHITE-YELLOW PAGE SERVICES AND EMERGENCY 911 LOCATION IDENTIFICATION, issued on May 27, 2003; U.S. Pat. No. 5,999,612 to Dunn et al., entitled INTEGRATED TELEPHONY AND DATA SERVICES OVER CABLE NETWORKS, issued on Dec. 7, 1999; U.S. Patent Application No. 2003/0093563 to Young et al., entitled METHOD AND SYSTEM FOR IMPLEMENTING AND MANAGING A MULTIMEDIA ACCESS NETWORK DEVICE, published on May 15, 2003; U.S. Patent Application No. 2003/0043974 to Emerson III, entitled STORED PROFILE SYSTEM FOR STORING AND EXCHANGING USER COMMUNICATIONS PROFILES TO INTEGRATE THE INTERNET WITH THE PUBLIS SWITCHED TELEPHONE NETWORK, published on Mar. 6, 2003; U.S. patent application No. 2003/0210766 to Lin et al., entitled INTELLIGENT MANAGEMENT SWITCH WITH EMERGENCY CALLING FUNCTIONALITY, published on Nov. 13, 2003; U.S. Pat. No. 6,614,884 to Jang, entitled, AUTOMATIC HOME ALARM SYSTEM AND METHOD, issued on Sep. 2, 2003; and U.S. Patent Application No. 2003/0035514 to Jang, entitled AUTOMATIC HOME ALARM SYSTEM AND METHOD, published on Feb. 20, 2003.

SUMMARY OF THE INVENTION

It is therefore an object of the present invention to provide an emergency calling system and method via a cable modem capable of transmitting an emergency calling signal to a PSTN via a PSTN backup line connected to the cable modem in response to an input signal from a subscriber telephone in the case of an emergency.

According to an aspect of the present invention for realizing the above object, a system is provided comprising: a memory adapted to store a number of emergency telephone numbers; a controller adapted to generate a control signal in response to first digits of a telephone number generated by a subscriber telephone connected to a cable modem upon the first digits containing a telephone number corresponding to one of the emergency telephone numbers stored in the memory; and a signal transmitter adapted to generate second digits corresponding to the first digits in response to the control signal from the controller and to transmit the second digits for the emergency telephone number to a Public Switched Telephone Network (PSTN) via a PSTN backup line connected to the cable modem.

Preferably, the controller comprises: a digit recognition unit adapted to generate a telephone number selected by the subscriber in response to the first digits generated by the subscriber telephone connected to the cable modem; and a control unit adapted to compare the telephone number generated by the digit recognition unit with the emergency telephone numbers stored in the memory, and to transmit a control signal to the signal transmiter to generate second digits corresponding to the emergency telephone number selected by the user according to the type of subscriber telephone upon the telephone number selected by the subscriber corresponding to one of the telephone numbers stored in the memory.

Preferably, the signal transmitter comprises: a Dual Tone Multi-Frequency (DTMF) signal-generator adapted to generate a DTMF signal corresponding to the emergency telephone number selected by the subscriber in response to the control signal from the controller upon the subscriber telephone being a digital telephone; and a DTMF signal transmitter adapted to transmit the DTMF signal from the DTMF signal-generator to the PSTN via the PSTN backup line connected to the cable modem.

Preferably, the signal transmitter further comprises an impedance-matching unit adapted to match impedances between a PSTN switching station and the cable modem and to transmit the DTMF signal for the emergency telephone number to a switching station via the DTMF signal transmitter.

Preferably, the impedance matching unit comprises a transformer.

Preferably, the signal transmitter comprises: a relay adapted to generate a pulse signal corresponding to the emergency telephone number selected by the subscriber in response to the control signal and to transmit the pulse to the PSTN via the PSTN backup line; and a relay controller adapted to generate and transmit a drive control signal to the relay to generate the pulse corresponding to the emergency telephone number selected by the subscriber in response to the digit generation control signal from the controller.

Preferably, the first digits generated by the subscriber telephone are identical to the second digits transmitted to the PSTN.

According to another aspect of the present invention for realizing the above object, a system is provided comprising: a memory adapted to store a number of emergency telephone numbers; a digit recognition unit adapted to generate a telephone number selected by a subscriber in response to first digits generated by a subscriber telephone connected to a cable modem; a controller adapted to compare the telephone number generated by the digit recognition unit with the emergency telephone numbers stored in the memory and to output a control signal to generate second digits corresponding to the emergency telephone number selected by the user according to the type of the subscriber telephone upon the telephone number selected by the subscriber corresponding to one of the telephone numbers stored in the memory; a Dual Tone Multi-Frequency (DTMF) signal-generator adapted to generate a DTMF signal corresponding to the emergency telephone number selected by the subscriber in response to the control signal from the controller upon the subscriber telephone being a digital telephone; a DTMF signal transmitter adapted to transmit the DTMF signal generated by the DTMF signal-generator; and an impedance matching unit adapted to match impedances between a Public Switched Telephone Network (PSTN) and the cable modem and to transmit the DTMF signal for the emergency telephone number from the DTMF signal transmitter to the PSTN via a PSTN backup line.

Preferably, the signal transmitter comprises: a relay adapted to generate a pulse signal corresponding to the emergency telephone number selected by the subscriber in response to the control signal and to transmit the pulse signal to the PSTN via the PSTN backup line; and a relay controller adapted to generate and transmit a drive control signal to the relay to generate the pulse signal corresponding to the emergency telephone number selected by the subscriber in response to the digit generation control signal from the controller.

According to yet another aspect of the present invention for realizing the above object, a method is provided comprising: generating a telephone number selected by a subscriber in response to digits generated by a subscriber telephone connected to a cable modem; comparing the telephone number selected by the subscriber with a number of pre-stored emergency telephone numbers; generating a Dual Tone Multi-Frequency (DTMF) signal corresponding to the telephone number selected by the subscriber upon the telephone number selected by the subscriber corresponding to one of the pre-stored emergency telephone numbers; and transmitting the DTMF signal to a Public Switched Telephone Network (PSTN) via a PSTN backup line.

Preferably, the method further comprises matching impedances between the PSTN and the cable modem.

Preferably, generating the DTMF signal comprises: operating a relay to generate a pulse signal for a telephone number corresponding to the emergency telephone number selected by the subscriber upon the subscriber telephone being an analog telephone; and transmitting the pulse signal for the emergency telephone number to the PSTN via the PSTN backup line connected to the cable modem.

According to still another aspect of the present invention for realizing the above object, a method is provided comprising: generating a telephone number selected by a subscriber in response to digits generated by a subscriber telephone connected to a cable modem; comparing the telephone number selected by the subscriber with a number of pre-stored emergency telephone numbers; generating a pulse signal corresponding to the emergency telephone number selected by the subscriber; and transmitting the pulse signal to a Public Switched Telephone Network (PSTN) via a PSTN backup line.

Preferably, the method further comprises matching impedances between the PSTN and the cable modem.

Preferably, generating the DTMF signal comprises: operating a relay to generate a pulse signal for a telephone number corresponding to the emergency telephone number selected by the subscriber upon the subscriber telephone being an analog telephone; and transmitting the pulse signal for the emergency telephone number to the PSTN via the PSTN backup line connected to the cable modem.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

A communication network via a cable modem is described below with reference to FIG. 1.

Figure 1:
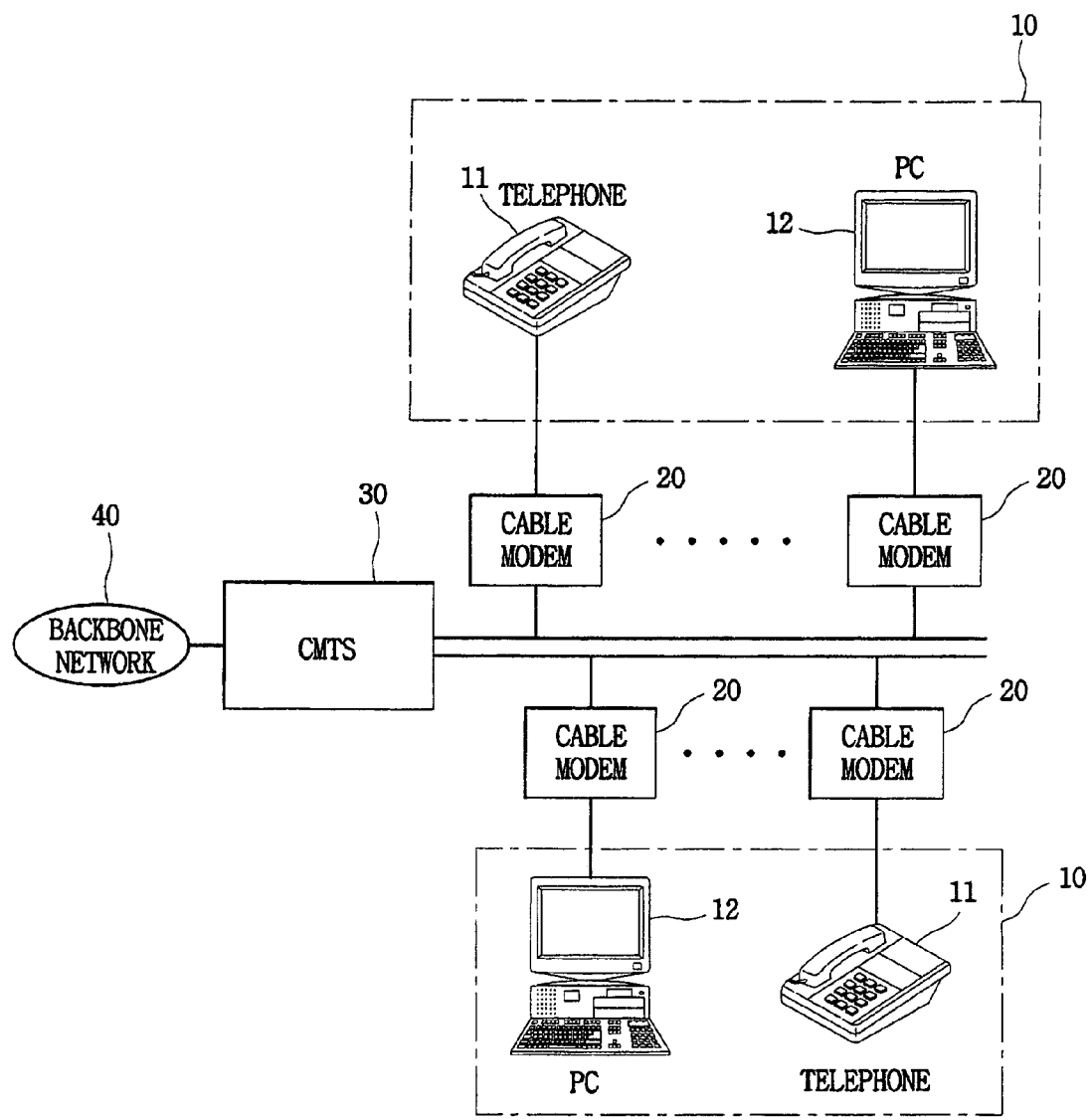
FIG. 1 is a link structure in a communication network via a cable modem.

FIG. 1 is a link structure in a communication network via a cable modem or cable network.

As shown in FIG. 1, the communication network via a cable modem comprises a backbone network 40 provided in the Internet, a Cable Modem Terminal System (hereinafter will be referred to as 'CMTS') 30 for allowing packet transmission between the backbone network 40 and a cable network, cable modems 20 connected to the cable network and Customer Premises Equipment (hereinafter will be referred to as 'CPEs') 10 connected to the respective cable modems 20.

The CMTS 30 can correspond to a cable broadcaster, an Internet Service Provider (ISP) and so on, and serves to provide communication data via the cable network.

The CMTS 30 also converts communication data into Internet packets which are in turn transmitted via the backbone network 40, and executes routing for communication data transmission within the cable network and filtering for protecting cable subscribers from hacking. The CMTS 30 also forms traffic for ensuring service quality to subscribers.

Each of the cable modems 20 converts communication data received from the CMTS 30 into Internet packets which are in turn transmitted to the CPE 10 via an Ethernet link. Each cable modem 20 also converts Internet packets, which are received from the CPE 10 via the Ethernet link, into communication data which is in turn transmitted to the CMTS 30 via the cable network.

Further, the each cable modem 20 provides voice packets transmitted from the CMTS 30 via the cable network to a telephone 11, and converts voice signals from the telephone 110 into voice packets which are in turn inputted to the CMTS 30 via the cable network.

Each of the CPEs can generally include the telephone 11 and a PC 12. The PC 12 can include a personal computer, a workstation, a network computer and other electronic devices.

An exemplary embodiment of an emergency calling system and method via a cable modem in accordance with the present invention is described in detail below with reference to the appended drawings.

Figure 2:
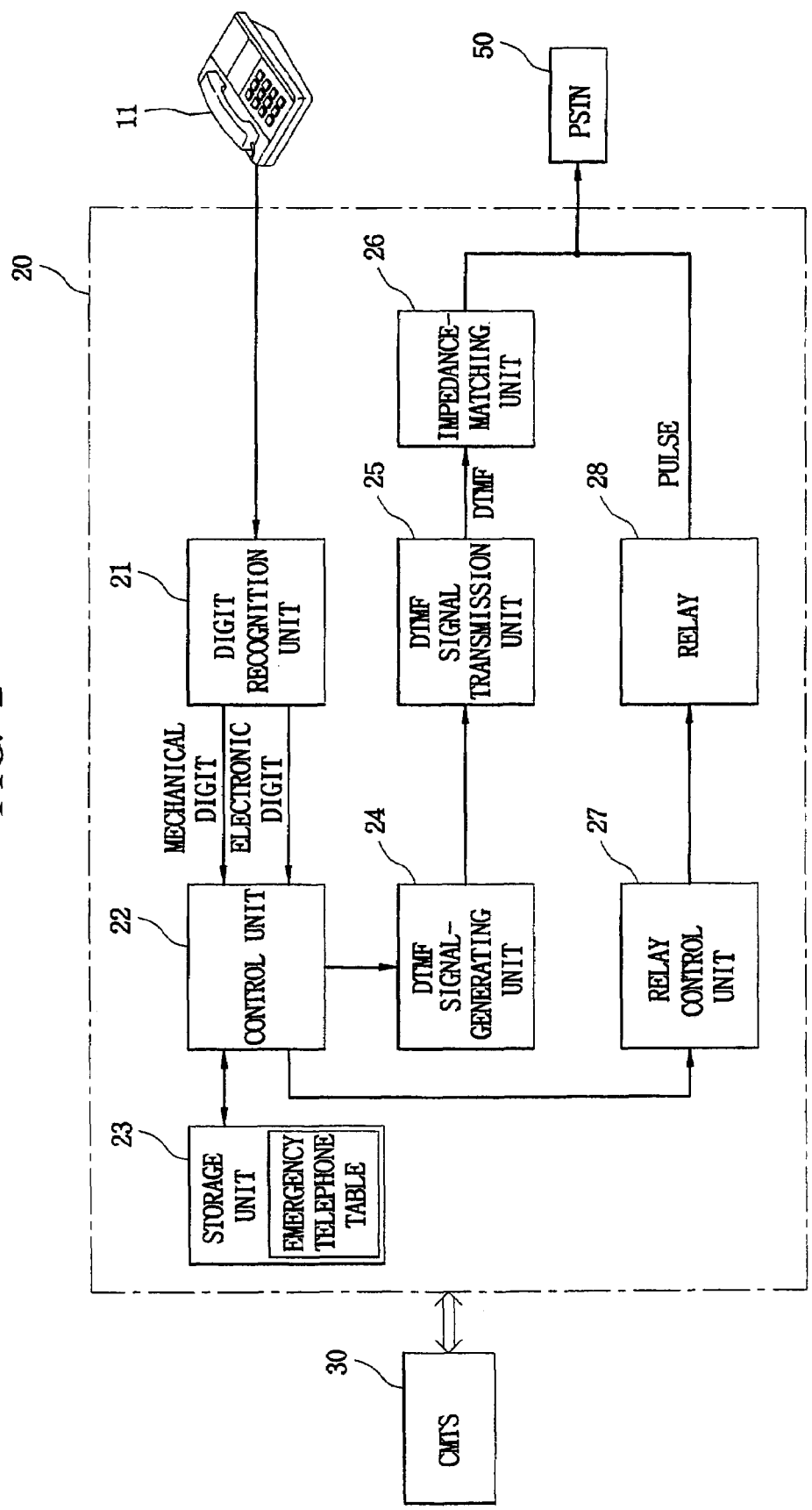
FIG. 2 is a block diagram of an emergency calling system via a cable modem in accordance with an embodiment of the invention.

FIG. 2 is a block diagram of an emergency calling system via a cable modem in accordance with an embodiment of the invention.

As shown in FIG. 2, an emergency calling system via a cable modem comprises a digit recognition unit 21, a control unit or controller 22, a storage unit or memory 23, a Dual Tone Multi-Frequency (DTMF) signal-generating unit or generator 24, a Dual Tone Multi-Frequency (DTMF) signal transmission unit or signal transmitter 25, an impedance-matching unit 26, a relay control unit or controller 27 and a relay 28.

The digit recognition unit 21 receives a digit signal from a telephone 11, and analyzes the received digit signal to find associated number information (e.g., telephone number) of the received digit signal, and inputs the associated number information to the control unit or controller 22.

The digit signal generated by the telephone 11 is a DTMF signal if the telephone 11 is an electronic or digital telephone, or a pulse signal according to relay processing if the telephone 11 is a mechanical or analog telephone. Therefore, the recognition unit 21 analyzes the associated digit signal in the form of the DTMF signal or the pulse signal generated by the telephone 11.

The control unit or controller 22 compares the number information (e.g., telephone number information) from the digit recognition unit 22 with emergency telephone number information stored in an emergency telephone table of the storage unit or memory 23 to determine if the digit signal from the telephone 11 has digits corresponding to any emergency telephone number. That is, the control unit or controller 22 executes comparison and analysis to determine if the telephone number dialed by a subscriber matches any emergency telephone number.

The control unit or controller 22 can analyze the digit signal according to various techniques. For example, since most emergency telephone numbers consist of three digits, the control unit or controller 22 can compare first three digits of the digit signal from the telephone 11 with those of the emergency telephone numbers to determine if the associated digit signal matches any of the emergency telephone numbers.

Alternatively, since most emergency telephone numbers can have a specific number, for example "1" as the first digit, the control unit or controller 22 can compare the first three digits with the emergency telephone table in the storage unit or memory 23 only if the first digit corresponds to the specific number, for example "1".

Otherwise, the control unit or controller 22 can compare all of the digits of the digit signal generated by the telephone 11 with the emergency telephone numbers in the emergency telephone table of the storage unit or memory 23 to determine if the associated digit signal matches any of the emergency telephone numbers in the emergency telephone table.

The number information for the plurality of emergency telephone numbers are stored in the form of a table In the storage unit or memory 23.

After comparison of the number information (e.g., telephone number information), if the digits of the digit signal generated by the telephone 11 do not match digits of the emergency telephone numbers, the control unit or controller 22 maintains a VoIP mode and transmits the associated digits to the CMTS 30 via the cable network. The CMTS 30 connects the calling telephone to a counterpart telephone via the Internet based upon the digits of the received digit signal so as to allow a voice conversation between a caller and a counterpart.

However, if the digits of the digit signal generated by the telephone 11 do match those of any of the emergency telephone numbers, the control unit or controller 22 converts the current VoIP mode into a PSTN mode, and then determines if the digits have been received from an analog telephone (i.e., mechanical telephone) or a digital telephone (electronic telephone).

If the digits have been received from a digital telephone, then the control unit or controller 22 inputs a control signal to the DTMF signal-generating unit or generator 24 to generate a DTMF signal corresponding to the associated digits.

In response to the digit-generation control signal from the control unit or controller 22, the DTMF signal-generating unit or generator 24 generates a DTMF signal, which is identical with the DTMF signal of the emergency telephone number inputted by the associated telephone, and inputs the DTMF signal to the DTMF signal transmission unit or signal transmitter 25.

The DTMF signal transmission unit or signal transmitter 25 transmits the DTMF signal generated by the DTMF signal-generating unit or generator 24 to the PSTN via the impedance-matching unit 26.

The impedance-matching unit 26 matches the impedance between the cable modem 20 and a switching station in order to stably transmit the DTMF signal, which is transmitted from the DTMF signal transmission unit or signal transmitter 25, to the switching station via the PSTN, and then the DTMF signal for the associated emergency telephone number to the PSTN. The impedance-matching unit 26 comprises a transformer, and functions to match the impedance between the cable modem 20 and an SLIC (not shown) within the switching station.

If the digits for the emergency telephone number are received in the form of a pulse signal from an analog telephone, the control unit or controller 22 inputs a control signal to the relay control unit or controller 27 to generate a pulse identical with that of the initial emergency telephone number, that is, a control signal for driving the relay 28 functioning to generate a pulse signal corresponding to the emergency telephone number selected by the subscriber.

In response to the control signal from the control unit or controller 22, the relay control unit or controller 27 controls the operation of the relay 28 generating the pulse signal corresponding to the emergency telephone number selected by the subscriber.

Accordingly, the relay 28 generates the pulse signal for the emergency telephone number, which is in turn transmitted to the PSTN 50 via the PSTN backup line connected to the cable modem 20 to execute emergency calling.

Hereinafter the following will specifically describe the operation of the emergency calling system via a cable modem of the above structure in accordance with an embodiment of the present invention, distinguishing a first embodiment where the cable modem 20 is connected to a digital telephone from a second embodiment where the cable modem 20 is connected to an analog telephone.

The following is a description of the first embodiment where the cable modem 20 is connected to the digital telephone.

When the digital telephone 11 generates DTMF digits, the digit recognition unit 21 of the cable modem 20 analyzes the digits from the digital telephone 11 and provides number information to the control unit or controller 22 in response thereto.

The control unit or controller 22 compares the number information from the digit recognition unit 21 with the emergency telephone number information stored in the emergency telephone table in the storage unit or memory 23 to determine if a telephone number inputted by the digital telephone 11 is an emergency telephone number.

If the input telephone number from the digital telephone is not an emergency telephone number, the control unit or controller 22 transmits the associated number information of the input telephone number to the CMTS 30, thereby allowing the subscriber to call a counterpart telephone via the Internet.

If it is determined that the input telephone number from the digital telephone 11 is an emergency telephone number, the control unit or controller 22 converts the current VoIP mode of the cable modem 20 into the PSTN mode, and then provides the DTMF signal-generating unit or generator or generator 24 with a control signal which is used in generation of a DTMF signal.

In response to the control signal for DTMF signal generation from the control unit or controller 22, the DTMF signal-generating unit or generator 24 generates a DTMF signal for a telephone number corresponding to the input telephone number from the subscriber, and provides the DTMF signal to the DTMF signal transmission unit or signal transmitter 25.

Accordingly, the DTMF signal transmission unit or signal transmitter 25 transmits the DTMF signal generated by the DTMF signal-generating unit or generator 24 to the PSTN 50 via the PSTN backup line.

The DTMF signal transmitted by the DTMF signal transmission unit or signal transmitter 25 is transmitted to the PSTN 50 after impedance matching between the cable modem 20 and the switching station via the impedance-matching unit 26.

The following is a description of the second embodiment where the telephone 11 shown in FIG. 2 is an analog telephone.

When a pulse (or a digit signal) for a telephone number is generated by the relay within the analog telephone 11, the digit recognition unit of the cable modem 20 analyzes the pulses from the analog telephone 11 to get number information of the telephone number selected by the subscriber, and provides the associated number information to the control unit or controller 22.

The control unit or controller 22 compares the number information (e.g., telephone number information) provided from the digit recognition unit 21 with the emergency telephone number information stored in the emergency telephone table in the storage unit or memory 23 to determine if a telephone number inputted by the analog telephone 11 is an emergency telephone number.

If the input telephone number from the analog telephone 11 is not an emergency telephone number, the control unit or controller 22 maintains the VoIP mode and transmits the associated number information of the input telephone number to the CMTS 30 via the cable network, thereby allowing the subscriber to call the counterpart telephone via the Internet.

However, if it is determined that the input telephone number from the digital telephone 11 is an emergency telephone number, the control unit or controller 22 converts the current VoIP mode of the cable modem 20 into the PSTN mode, and then provides the relay control unit or controller 27 with a control signal for operating the relay 28 corresponding to the associated emergency telephone number.

In response to the control signal provided from the control unit or controller 22, the relay control unit or controller 27 controls the relay 28 to generate a pulse signal corresponding to the input telephone number from the subscriber so that the emergency telephone number pulse signal from the relay 28 is transmitted to the PSTN 50 via the PSTN backup line connected to the cable modem, thereby allowing the subscriber to call the emergency telephone number.

Hereinafter an emergency calling method via a cable modem in accordance with an embodiment of the present invention corresponding to the afore-described emergency calling system via a cable modem of the present invention will be described stepwise with reference to FIG. 3.

Figure 3:
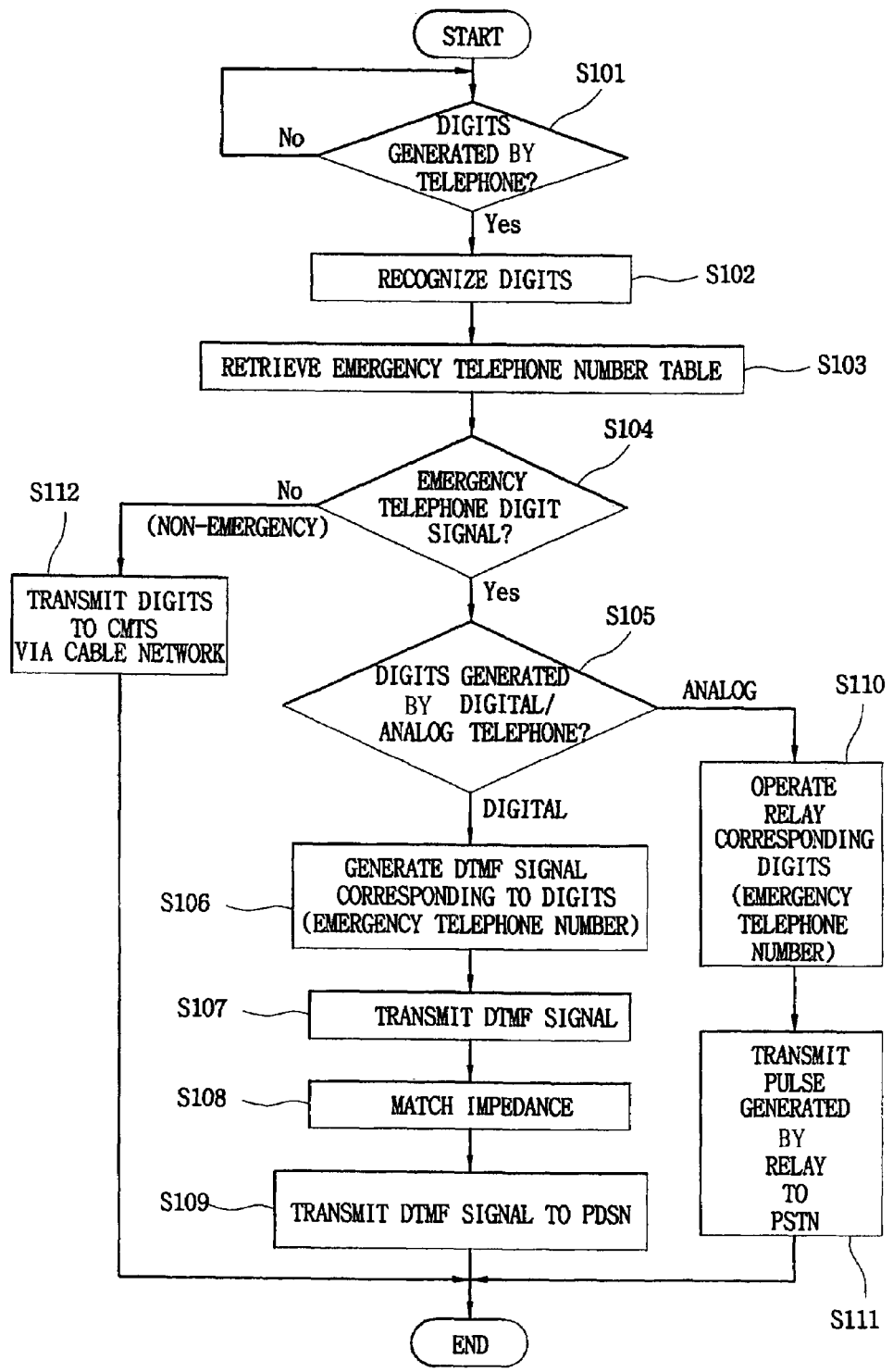
FIG. 3 is a flowchart of an emergency calling method via a cable modem in accordance with an embodiment of the invention.

FIG. 3 is a flowchart of an emergency calling method via a cable modem in accordance with an embodiment of the present invention.

As shown in FIG. 3, the emergency calling system determines whether a digit signal or a pulse signal for a telephone number has been generated by a telephone connected to the cable modem in step S101.

If it has been determined that the digit signal or pulse signal for a telephone number has been generated by the telephone, the emergency calling system analyzes the generated digit signal or pulse signal to obtain the telephone number information corresponding to digits of the digit signal or a pulse value of the pulse signal in step S102.

After analysis of the input telephone number from the subscriber, the emergency telephone number table is retrieved in step S103 in order to determine if the input telephone number from the subscriber corresponds to any of the emergency telephone numbers stored in the emergency telephone number table, that is, a determination is made in step S104 as to whether the input telephone number from the subscriber is an emergency telephone number.

If it has been determined that the input telephone number from the subscriber is not an emergency telephone number, that is, the input telephone number from the subscriber is not any of the emergency telephone numbers stored in the emergency telephone number table, then the current VoIP mode of the cable modem is maintained and the digits or the pulse value for the associated telephone number are transmitted to the CMTS via the cable network. Then, the CMTS calls a counterpart telephone via the Internet to execute Internet telephone service in step S112.

However, if it has been determined in step S104 that the input telephone number corresponds to one of the emergency telephone numbers stored in the emergency telephone number table, then the current VoIP mode of the cable modem is converted into the PSTN mode, and then the emergency calling system determines whether the subscriber telephone is a digital telephone or an analog telephone in step S105. In this case, if the signal for the telephone number inputted by the subscriber telephone is a DTMF signal, then the associated subscriber telephone is determined to be a digital telephone. If the signal for the telephone number is in the form of a pulse signal, then the associated subscriber telephone is determined to be an analog telephone.

If the subscriber telephone is an digital telephone, then the emergency calling system generates a DTMF signal for the emergency telephone number inputted (or selected) by the subscriber in step S106, and transmits the DTMF signal via the PSTN backup line connected to the cable modem in step S107. In this case, the emergency calling system executes impedance matching to the DTMF signal for the emergency telephone number to ensure a stable transmission of the DTMF signal in step S108, and then the impedance-matched DTMF signal is transmitted via the PSTN to the switching station in step S109.

As a result, the emergency calling system calls an organization or a public office corresponding to the emergency telephone number via the switching station so that the subscriber can have an emergency conversation with the organization or public office.

However, if the subscriber telephone is determined to be a analog telephone in step S105, then the emergency calling system operates the relay to generate a pulse signal corresponding to the emergency telephone number inputted (or selected) by the subscriber in step S110, and then transmits the pulse signal for the emergency telephone number generated by the relay to the PSTN via the PSTN backup line connected to the cable modem in step S111.

Summarizing the emergency calling system and method via a cable modem in accordance with embodiments of the present invention, when the telephone subscriber dials the emergency telephone number via the cable modem connected to the PSTN backup line, the digit recognition unit 21 of FIG. 2 translates the associated digits into numbers and then provides associated number information to the control unit or controller 22.

The control unit or controller 22 refers to the emergency telephone numbers stored in the emergency telephone number table of the storage unit or memory 23 to determine whether the telephone number dialed by the subscriber is one of the emergency telephone numbers. If the input telephone number is one of the emergency telephone numbers, then the control unit or controller 22 converts the VoIP mode, if any, into the PSTN mode, and then controls the DTMF signal-generating unit or generator 24 to generate a DTMF signal corresponding to the associated emergency telephone number.

The DTMF signal-generating unit or generator 24 generates a DTMF signal corresponding to digits (i.e., emergency telephone number) corresponding to those inputted by the subscriber and transmits the DTMF signal to the PSTN to allow emergency calling.

In this case, if the subscriber telephone is an analog telephone, the control unit controls the relay control unit 27 to operate the relay 28 installed within the cable modem 20.

Then, a pulse signal for the emergency telephone number generated via the relay 28 is transmitted to the PSTN to allow emergency calling.

The emergency calling system and method via a cable modem in accordance with embodiments of the present invention as set forth above has the cable modem connected to the PSTN backup line in a cable modem-based Internet telephone service to transmit the emergency telephone number inputted from the subscriber telephone to the PSTN via the PSTN backup line. As a result, this has an effect to conform to the global trend which requires emergency calling function via a PSTN backup circuit and a stable PSTN in a cable modem-based Internet telephone service.

Further, the present invention allows cable modem-based Internet telephone service to promptly provide urgent emergency calling via the PSTN line in case of an emergency.

What is claimed is:

1. A system comprising:
   a memory adapted to store a number of emergency telephone numbers;
   a controller adapted to generate a control signal in response to first digits of a telephone number generated by a subscriber telephone connected to a cable modem upon the first digits containing a telephone number corresponding to one of the emergency telephone numbers stored in the memory; and
   a signal transmitter adapted to generate second digits corresponding to the first digits in response to the control signal from the controller and to transmit the second digits for the emergency telephone number to a Public Switched Telephone Network (PSTN) via a PSTN backup line connected to the cable modem.

2. The system according to claim 1, wherein the controller comprises:
   a digit recognition unit adapted to generate a telephone number selected by the subscriber in response to the first digits generated by the subscriber telephone connected to the cable modem; and
   a control unit adapted to compare the telephone number generated by the digit recognition unit with the emergency telephone numbers stored in the memory, and to transmit a control signal to the signal transmitter to generate second digits corresponding to the emergency telephone number selected by the user according to the type of subscriber telephone upon the telephone number selected by the subscriber corresponding to one of the telephone numbers stored in the memory.

3. The system according to claim 1, wherein the signal transmitter comprises:
   a Dual Tone Multi-Frequency (DTMF) signal-generator adapted to generate a DTMF signal corresponding to the emergency telephone number selected by the subscriber in response to the control signal from the controller upon the subscriber telephone being a digital telephone; and
   a DTMF signal transmitter adapted to transmit the DTMF signal from the DTMF signal-generator to the PSTN via the PSTN backup line connected to the cable modem.

4. The system according to claim 3, wherein the signal transmitter further comprises an impedance-matching unit adapted to match impedances between a PSTN switching station and the cable modem and to transmit the DTMF signal for the emergency telephone number to a switching station via the DTMF signal transmitter.

5. The system according to claim 4, wherein the impedance matching unit comprises a transformer.

6. The system according to claim 1, wherein the signal transmitter comprises:
   a relay adapted to generate a pulse signal corresponding to the emergency telephone number selected by the subscriber in response to the control signal and to transmit the pulse to the PSTN via the PSTN backup line; and
   a relay controller adapted to generate and transmit a drive control signal to the relay to generate the pulse corresponding to the emergency telephone number selected by the subscriber in response to the digit generation control signal from the controller.

7. The system according to claim 1, wherein the first digits generated by the subscriber telephone are identical to the second digits transmitted to the PSTN.

8. A system comprising:
   a memory adapted to store a number of emergency telephone numbers;
   a digit recognition unit adapted to generate a telephone number selected by a subscriber in response to first digits generated by a subscriber telephone connected to a cable modem;
   a controller adapted to compare the telephone number generated by the digit recognition unit with the emergency telephone numbers stored in the memory and to output a control signal to generate second digits corresponding to the emergency telephone number selected by the user according to the type of the subscriber telephone upon the telephone number selected by the subscriber corresponding to one of the telephone numbers stored in the memory;
   a Dual Tone Multi-Frequency (DTMF) signal-generator adapted to generate a DTMF signal corresponding to the emergency telephone number selected by the subscriber in response to the control signal from the controller upon the subscriber telephone being a digital telephone;

a DTMF signal transmitter adapted to transmit the DTMF signal generated by the DTMF signal-generator; and an impedance matching unit adapted to match impedances between a Public Switched Telephone Network (PSTN) and the cable modem and to transmit the DTMF signal for the emergency telephone number from the DTMF signal transmitter to the PSTN via a PSTN backup line.

9. The system according to claim 6, wherein the signal transmitter comprises:

a relay adapted to generate a pulse signal corresponding to the emergency telephone number selected by the subscriber in response to the control signal and to transmit the pulse signal to the PSTN via the PSTN backup line; and a relay controller adapted to generate and transmit a drive control signal to the relay to generate the pulse signal corresponding to the emergency telephone number selected by the subscriber in response to the digit generation control signal from the controller.

10. A method comprising:

generating a telephone number selected by a subscriber in response to digits generated by a subscriber telephone connected to a cable modem;

comparing the telephone number selected by the subscriber with a number of pre-stored emergency telephone numbers;

generating a Dual Tone Multi-Frequency (DTMF) signal corresponding to the telephone number selected by the subscriber upon the telephone number selected by the subscriber corresponding to one of the pre-stored emergency telephone numbers; and transmitting the DTMF signal to a Public Switched Telephone Network (PSTN) via a PSTN backup line.

11. The method according to claim 10, further comprising matching impedances between the PSTN and the cable modem.

12. The method according to claim 10, further compromising:

operating a relay to generate a pulse signal for a telephone number corresponding to the emergency telephone number selected by the subscriber upon the subscriber telephone being an analog telephone; and transmitting the pulse signal for the emergency telephone number to the PSTN via the PSTN backup line connected to the cable modem.

13. A method comprising:

generating a telephone number selected by a subscriber in response to digits generated by a subscriber telephone connected to a cable modem;

comparing the telephone number selected by the subscriber with a number of pre-stored emergency telephone numbers;

generating a pulse signal corresponding to the emergency telephone number selected by the subscriber; and transmitting the pulse signal to a Public Switched Telephone Network (PSTN) via a PSTN backup line.

14. The method according to claim 13, wherein generating the pulse signal comprises:

operating a relay to generate a pulse signal for a telephone number corresponding to the emergency telephone number selected by the subscriber upon the subscriber telephone being an analog telephone; and transmitting the pulse signal for the emergency telephone number to the PSTN via the PSTN backup line connected to the cable modem.

* * * * *